United States Patent [19]

Gruenke

[11] Patent Number: 4,666,301
[45] Date of Patent: May 19, 1987

[54] RADIATION RESPONSIVE INTEGRATING AMPLIFIER

[75] Inventor: Roger A. Gruenke, Wilmington, Del.

[73] Assignee: E. I. Du Pont de Nemours and Company, Wilmington, Del.

[21] Appl. No.: 731,782

[22] Filed: May 8, 1985

[51] Int. Cl.$^4$ .............................................. G01J 1/46
[52] U.S. Cl. ................................... 356/215; 307/311;
328/128; 356/218; 356/224; 356/226
[58] Field of Search .............. 356/213, 215, 218, 224,
356/226, 223, 324, 328; 354/443–444, 410, 424,
459–461, 463; 250/207; 307/311, 359, 228, 317,
494; 328/128

[56] References Cited

U.S. PATENT DOCUMENTS

| | | |
|---|---|---|
| 3,641,891 | 2/1972 | Burgarella ........................... 354/442 |
| 3,871,767 | 3/1975 | Holm-Hansen et al. ............ 356/215 |
| 4,306,807 | 12/1981 | Sakane et al. ....................... 356/223 |
| 4,348,110 | 9/1982 | Ito ....................................... 356/328 |
| 4,390,258 | 6/1983 | Mizokami ............................ 354/24 |

OTHER PUBLICATIONS

Mitra, "An Introduction to Digital and Analog Integrated Circuits and Applications", Harper & Row, New York, 1980, pp. 307–309.

*Primary Examiner*—R. A. Rosenberger

[57] ABSTRACT

Light induced current from a photodiode is converted into a voltage proportional to the integral with respect to time of the current using two serially connected integrating operational amplifiers. In each case the integrating capacitors are connected so that the photodiode is part of the charge current for the capacitors. The amplifiers operate in sequence.

5 Claims, 2 Drawing Figures

RADIATION RESPONSIVE INTEGRATING AMPLIFIER

BACKGROUND OF THE INVENTION

Photometers are now being built which are capable of measuring multifunctions, i.e., they measure not only the absorbance of light by a sample material, but also they are able to make fluorescence, turbidimetric and nephelometric measurements. A photometer of this type is described in an application Ser. No. 731,781, entitled Absorbance, Turbidimetric, Fluorescence, and Nephelometric Photometer (Bach and Robertson) filed concurrently herewith. When making such multiple measurements, the light intensities impinging upon the photodetectors vary over a relatively large dynamic range. For example, when an array detector is used, the various photodiodes comprising the array detector may receive anything varying from a brief flash of fluorescence of relatively low intensity to a continuous relatively high intensity radiation such as provided by the output of an absorbance type measurement.

Another problem encountered with fluorescent measurements is that the light sources used for such measurements, typically a xenon tube, are relatively unsteady. Self interrogating integrating detectors are available for such measurements, but all of these are relatively expensive particularly since a separate channel must be used for each element of the array detector. As an alternative, multiplexing techniques may be used to pass the output of each element of an array detector to a single amplifier. Unfortunately, such approaches using multiplexers typically are more noisy and tend to be less suitable for low intensity light.

SUMMARY OF THE INVENTION

Many of these problems encountered with integrating amplifiers of the prior art are solved by this invention which uses a radiation responsive integrating amplifier. This amplifier converts the light induced current from a photodiode into a voltage proportional to the integral with respect to time of the photodiode current. The integrating amplifier, which is capable of integrating over a relatively wide dynamic range of radiation input intensities, has a first operational amplifier having inverting and non-inverting inputs and an output, the first amplifier comprising an integrating capacitor coupled between the output and the inverting input of the amplifier, and means for applying a pulse that is positive going relative to a point of reference potential to the non-inverting input of the first operational amplifier. The integrating amplifier has a photodiode whose cathode is coupled to the point of reference potential and whose anode is coupled to the inverting input of the first operational amplifier. This permits the capacitor to be charged through the photodiode to provide a positive amplifier output signal relative to the reference potential. Thereafter, radiation impinging on the photodiode creates a current which discharges the capacitor by an amount proportional to the time integral of the radiation intensity.

To provide an amplifier having a larger dynamic range, a second operational amplifier like the first is provided but the second amplifier's inverting input is coupled to the anode of the photodiode and its non-inverting input is coupled to the output of the first operational amplifier. Preferably, the output of the first amplifier is coupled through a diode in the forward direction to the inverting input of the second amplifier and a resistor is connected between the inverting input of the second amplifier and the point of reference potential.

With this arrangement, the capacitance of the integrating capacitor of the first amplifier may be made relatively small compared to the capacitance of the integrating capacitor of the second amplifier such that a low intensity light signal impinging on the photodiode causes a current which is integrated solely by the first amplifier. Those signals of larger and greater intensity cause the first amplifier to saturate and most of the integration takes place with the second amplifier having the larger valued capacitor. With this arrangement, the first amplifier disables the second until the first amplifier almost reaches negative saturation voltage. After the first amplifier saturates, the second integrates the photodiode current. At any time the total integral is available by measuring the outputs of both amplifiers and summing them after compensating for any difference in the gain of the two integrators. The amplifiers are relatively inexpensive and yet highly accurate so that they may be coupled to each photodiode element of the array.

BRIEF DESCRIPTION OF THE DRAWINGS

The invention may be more fully understood from the following detailed description thereof taken in connection with accompanying drawings which form a part of this application and in which.

DETAILED DESCRIPTION OF THE PREFERRED EMBODIMENT

Figure 1:
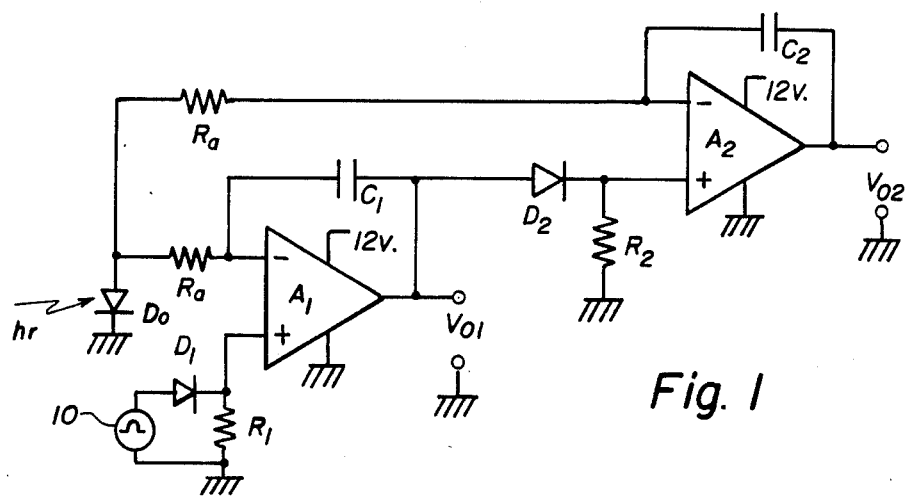
FIG. 1 is a schematic diagram of an integrating circuit constructed in accordance with this invention.

With particular reference to FIG. 1, there may be seen a photodiode $D_0$ which may be a silicon photodiode typically of the type that is used in an array detector. The integrating amplifier depicted in FIG. 1 will be in the integrating amplifier that is used for each channel of the array detector. The cathode of the photodiode $D_0$ is connected to ground and the anode of the photodiode is connected through an isolating resistor $R_a$ to the inverting input of an operational amplifier $A_1$ which may be a Texas Instruments TLC271 CMOS operational amplifier. The non-inverting input of the operational amplifier $A_1$ is connected through a resistor $R_1$ to ground and through the cathode of a signal diode $D_1$ to a source 10 of a positive going pulse which source 10 is connected to ground.

The output of the operational amplifier $A_1$ is connected to an output terminal $V_{01}$ and through an integrating capacitor $C_1$ to the inverting input of the amplifier $A_1$. The output of the amplifier is also connected through a diode $D_2$ in the forward direction and a resistor $R_2$ to ground. The junction between the diode $D_2$ and resistor $R_2$ is connected to the non-inverting input of a second operational amplifier $A_2$ which may be the same as the amplifier $A_1$. The output of the second amplifier $A_2$ is connected to a pair of output terminals $V_{02}$ and through a second integrating capacitor $C_2$ to the inverting input of the second amplifier $A_2$ and through an isolating resistor $R_d$ to the anode of the photodiode $D_0$. The photodiode of course is subjected to light designated hv from the input radiation to the diode array which typically may be from a light source used in a photometer or from any source of radiation to be measured.

In operation, this integrating amplifier converts the light-induced current from a photodiode into a voltage proportional to the integral with respect to time of the photodiode current. Initially the integrating amplifier is reset.

During the reset phase, a sufficiently large positive voltage is applied across $R_1$. This causes current to flow from the amplifier output through $C_1$ and in the forward direction through the photodiode $D_0$, the photodiode (used in this mode as a common diode). When the output of the amplifier reaches its positive saturation voltage, the reset process is complete, and integrating capacitor $C_1$ is charged to a voltage equal to the positive saturation voltage of the amplifier minus the forward bias voltage across $D_0$.

The reset voltage across $R_1$ may be removed to switch to the active mode. The voltage at the amplifier output now drops by an amount proportional to the charge contained in the internal capacitance of the photodiode $D_0$, as this charge is neutralized by transfer of an equal amount of charge from the integrating capacitor $C_1$.

During the active mode, current generated by light falling on the photodiode decreases the charge accumulated in $C_1$, causing the amplifier output voltage to decrease towards its negative saturation voltage. When the amplifier output voltage reaches this negative saturation voltage, charge transfer ceases to change the amplifier output voltage, and the circuit no longer responds to light.

Several of these amplifier circuits may be used with a multi-diode array in a grating-based spectrophotometer. The non-inverting inputs (+) of all amplifiers connected to the diode array are connected together, thus resetting all amplifiers simultaneously. The $C_1$ capacitance values are chosen to cause all amplifier outputs to reach the negative saturation voltage at approximately the same time when a continuous "white" light source illuminates the array via the diffraction grating.

The description thus far is that of using only the first amplifier $A_1$. In the event a wider dynamic range is required, the second integrator involving the amplifier $A_2$ is also used with the connection shown in FIG. 1. The first amplifier $A_1$ disables the second amplifier $A_2$ until the first amplifier almost reaches its negative saturation voltage. After the first amplifier saturates, the second amplifier $A_2$ integrates the photodiode current. At any time, the total integral is available by measuring the outputs of both amplifiers and summing them.

The diodes $D_1$ and $D_2$ are ordinary silicon signal diodes, for example, 1N914 or equivalent. Typically the first capacitor $C_1$ will be relatively small value such as in the order of twenty picorfarads while the second capacitor $C_2$ will be a large value up to 0.47 microfarads or even larger. The value of resistor $R_2$ is not critical, typically it may be in the order of 100K ohms. The value of resistor $R_1$ also is not critical, a typical value of maybe 1K ohms. The input diode $D_1$ is not absolutely essential to the operation of this circuit as long as the reset signal can be coupled to $R_1$ when present and there is no voltage present across $R_1$ when the amplifier is in the active mode.

Figure 2:
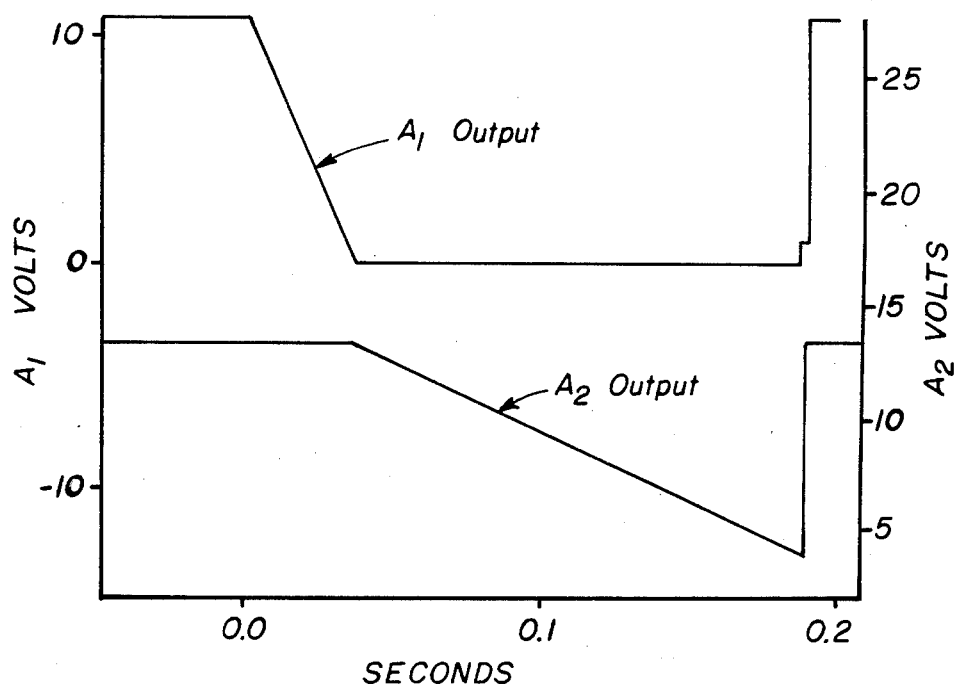
FIG. 2 is a plot of voltage against time depicting the outputs of the two integrating amplifiers of FIG. 1.

The operation of the amplifier may be better understood by the following detailed description considered in conjunction with FIG. 2. During the reset mode, the non-inverting input of amplifier $A_1$ is driven to a voltage more positive than the open-circuit voltage of the photodiode $D_0$ plus the light induced voltage from $D_0$ plus the maximum input offset voltage for $A_1$ (plus a safety factor). This causes the amplifier output to swing positive. The capacitor $C_1$ couples this voltage swing to the inverting input until $D_0$ begins to conduct in the forward direction (current flow into the diode from $C_1$). Current flows into $C_1$ from the output of the first amplifier $A_1$ until the output voltage of $A_1$ reaches its positive output saturation voltage. Vsat+. The voltage across $C_1$ is now Vsat+ minus $V(D_0)$.

In the version of the amplifier having the wider dynamic range, the second amplifier $A_2$ and its integrating capacitor $C_2$ will now also respond in a similar fashion to $A_1$ and $C_1$ because diode $D_2$ couples the output of $A_1$ to the non-inverting input of $A_2$ to perform the same function as the reset signal at the non-inverting input of $A_1$. As the small step 12 in FIG. 2 shows, $A_1$ partially resets, causing $A_2$ to reset; then $A_1$ finishes resetting.

At the end of the reset signal, the voltage across $R_1$ goes to 0 volts, and the output of $A_1$ goes to a lower voltage than Vsat+. If $C_1$ is very large compared to the internal capacitance ($C_0$) of photodiode $D_0$, this lower voltage will be approximately equal to the voltage across $C_1$ described above, but in any case, the new voltage at the output of $A_1$ will be determined by the ratio of capacitances and the voltage to which each is charged by the end of the reset signal ($C_0$ is charged to the voltage across $D_0$).

In the active mode, light impinging on the photodiode $D_0$ produces a current in $D_0$ which flows out of the diode, and into $C_1$. The first amplifier $A_1$ changes its output voltage to keep the voltage difference between its inputs very close to zero—in this case the output voltage decreases due to neutralization of the charge on $C_1$ by the current from $D_0$. Thus the voltage at the output of $A_1$ is equal to the voltage after the end of the reset interval, minus the integral of the photoinduced current from the photodiode, $D_0$.

After some time this integral will equal the original voltage at the output of the amplifier, and the observed voltage will be zero. Just prior to this, the voltage appearing across $R_2$ will be close to zero, and the second amplifier $A_2$ will begin integrating the photoinduced current from $D_0$.

During a (short) transition period, both amplifiers will be integrating the current, until amplifier $A_1$ saturates at its negative output saturation voltage. At any time, the total integral of the photoinduced current from $D_0$ is available by measuring the change, since the end of the Reset mode, in the output voltage of both amplifiers $A_1$ and $A_2$ and correcting for the difference in gain of the integrators as established by the capacitances of $C_1$ and $C_2$.

Typically, a small capacitor (20 pF) is used for $C_1$, and a larger capacitor (1.0 to 33 nF) for $C_2$. This allows measurement of small amounts of light such as the fluorescent emission of a small amount of reagent by the action of $A_1$, while large amounts of light such as that from an absorbance test are accommodated by $A_2$.

This invention provides a means for measuring light over a wide dynamic range using both pulsed and continuous operation using only low-cost components. Multichannel measurements are greatly facilitated by the small number of (noncritical) components used per channel. The capacitors do not introduce thermally induced noise voltages like that from high value resistors which are typically found in similar applications.

By storing the integral of photoinduced current from pulsed sources, the rest of the system (multiplexer and analog-to-digital converter) can operate at much lower rates than with resistors.

What is claimed is:

1. A radiation responsive integrating amplifier for integrating over a wide dynamic range of radiation intensities comprising:
   (a) a first operational amplifier having inverting and non-inverting inputs and an output, the first amplifier including
      (1) an integrating capacitor coupled between the output and inverting input of the amplifier, and
      (2) means for applying a pulse that is positive going relative to the point of reference potential to the non-inverting input of the first operational amplifier, and
   (b) a photodiode having a cathode coupled to a point of reference potential and an anode coupled to the inverting input of the first operational amplifier for charging the capacitor through the photodiode to provide a positive amplifier output signal relative to the reference potential, whereby radiation impinging on the photodiode creates a current which discharges the capacitor by an amount proportional to the time integral of the radiation.

2. The amplifier set forth in claim 1 in which a first resistor is connected between the photodiode anode and the inverting input.

3. The amplifier set forth in claim 2 which includes a second operational amplifier having inverting and non-inverting inputs, an output, and an integrating capacitor coupled between the output and inverting input of the amplifier and having its inverting input coupled to the anode of the photodiode and its non-inverting input coupled to the output of the first operational amplifier.

4. The amplifier set forth in claim 3 wherein the output of the first amplifier is coupled through a diode in the forward direction to the non-inverting input of the second amplifier and which includes a resistor connected between the inverting input of the second amplifier and the point of reference potential.

5. The amplifier set forth in claim 4 wherein the integrating capacitor of the first amplifier is smaller in capacitance than the integrating capacitor of the second amplifier.

* * * * *